UNITED STATES PATENT OFFICE.

WM. L. FABER, OF NEW YORK, N. Y.

IMPROVED PROCESS OF WORKING SILVER ORES.

Specification forming part of Letters Patent No. 47,286, dated April 18, 1865.

*To all whom it may concern:*

Be it known that I, WILLIAM L. FABER, of the city, county, and State of New York, have invented a new and Improved Process for Working Silver Ores; and I do hereby declare that the following is a full, clear, and exact description thereof, which will enable others skilled in the art to fully understand and use the same.

The object of this invention is to work silver ores more economically than can be done by the present process, and it is intended to be applied to real ores of silver—such as occur in Arizona, Nevada, &c.—but not to argentiferous lead ores. Where gold occurs with the silver ores, it is all obtained by this process, alloyed with the silver.

The invention consists in a process which is divided in eight different manipulations—viz., smelting the ore, pulverizing, roasting at low heat, extracting sulphates with water, roasting residue with salt, melting with soda, precipitating silver, precipitating copper. Of these eight manipulations, however, the first—viz., the smelting—may in some cases be omitted; and in that case the sixth manipulation—viz., the melting with soda—cannot be performed on account of the great bulk of material. This manipulation, therefore, has to be modified, and instead of melting the residue with soda it is treated with a boiling solution of salt, as will be hereinafter more fully explained. Furthermore, when the ores contain no copper, and when no pyrites is added in the first manipulation, then the fourth, seventh, and eighth manipulations will be omitted.

First manipulation—smelting the ore: The object of the smelting is merely to concentrate all the metals in a matt, and thus get rid of all quartz and other gangue matter in the ore. The smelting is done in a blast-furnace, such as is commonly used for smelting copper slags, with a fan-blast, and charcoal fuel. The ore must be fluxed with admixture of either limestone and iron ore or quartz, if the gangue is sparry, and adding fluor-spar, if it is to be had, in order to produce as fluid a slag as possible, from which the matt will easily separate. If the silver ores are very rich, some iron pyrites is added, preferring gold-bearing pyrites, as the gold will all concentrate in the silver. The object of adding pyrites is to dilute the matt, and thus prevent the loss of silver, both by volatilization in the furnace, and by the mechanical inclosure of prills of matt in the slag. By the smelting the mass to be handled is reduced to the actual metallic ore, and the stamping of about ninety-five per cent. of hard quartz is avoided. Still, in some localities, where fuel is very expensive, and no gold occurs to be added in pyrites, it may be cheaper to stamp all the ores than to smelt. The fuel required will be from fifteen to twenty-five bushels charcoal per ton of ore, according to the fusibility of the gangue and flux, quality of coal, skill in conducting the operation, &c.

Second manipulation: The matt is pulverized to an impalpable powder, and all passed through a sieve with about sixteen hundred holes to the square inch. The pulverizing can in most cases be most cheaply done by a set of crushing-cylinders.

Third manipulation: The pulverized matt is roasted at a low red heat, to oxidize the sulphur and form sulphates of iron, copper, and silver. The roasting must not be carried so far as to decompose the sulphates by driving off sulphuric acid, which point can be practically determined by observing the roasted matt. The sulphuric acid of the sulphate of iron is expelled first, next that of the sulphate of copper, and lastly that of the sulphate of silver, if the heat is continued too long or raised too high. So long as any sulphate of copper remains undecomposed, none of the sulphate of silver is decomposed. The time to stop roasting, therefore, is when the sulphate of iron begins to be decomposed, while the sulphuret of copper is already all oxidized. Some of the silver will then remain unoxidized as sulphuret.

Fourth manipulation: The sulphates formed are extracted with water. If it is convenient to use warm water, it will be the better. This dissolves out all the sulphate of iron remaining undecomposed, all the sulphate of copper, and a little sulphate of silver. The treatment of this liquid is described below under VII. The solution is effected in dissolving-vats—such as are used in chemical works. They are four or five feet square, and three feet deep, arranged in three tiers, one above another, so that the solution may flow successively from the upper to the lower vats. Each vat, at a height of three inches above the bottom, has a false bottom pierced with holes and covered with canvas, the edges being made tight with tow. A wooden spigot allows the liquid to be drawn off between the two bottoms. Before placing the matt on the canvas the latter must be thoroughly wetted. The solution from the upper tier of vats is drawn off upon fresh matt in the vats of the second tier, &c. When the ores contain no copper, and when no pyrites is added in the first manipulation, then this fourth manipulation becomes superfluous and may be omitted, in which case the seventh and eighth manipulations, which depend on the fourth, are omitted also.

Fifth manipulation: The residue is roasted, after being once more pulverized, if necessary, with an admixture of common salt, commonly in the proportion of three pounds of salt for every pound of silver in the matt; but the quantity of salt may differ widely for different ores, and the proper proportion can only be ascertained by actual trial at each locality. The process of roasting lasts for a charge of one ton of matt about five hours, during which time the temperature is gradually raised to an orange-heat, at which the whole charge is kept during the last hour of roasting. By this operation the metals are all converted into chlorides. The chlorides of silver and lead and part of the chloride of iron remain, the chlorides of antimony and arsenic and part of the chloride of iron are volatilized. The gold still remains with the silver.

Sixth manipulation: This mass is to be melted with carbonate of soda. This may be done in a small blast-furnace, placing the charge in contact with the fuel; but the operation is very difficult, and only to be performed successfully by an experienced workman. It is somewhat more expensive, but commonly preferable, as not liable to occasion loss of silver, and as being an operation performed by any unskilled hand. To mix the chlorides with the soda, place the mixture in a large crucible or melting-pot—such as are used for melting steel—and heat this to whiteness in a common air-furnace. An excess of soda over the weight of the chlorides will commonly be required, and if much iron remains with the chlorides the excess of soda must be large and powdered quartz should be added to flux off the iron. For this reason it is best not to roast too much in the third operation, so that the iron may all or nearly all remain as sulphate and be dissolved out in the fourth operation. The result of this melting is metallic silver, containing all the gold which was in the ore, and alloyed with lead, if the ore contained any, but, if the operation was conducted carefully, quite free from copper, antimony, arsenic, and iron. The soda may, if no native soda (trina) occurs in the country, be cheaply made at the works in the usual way of manufacturing soda, by heating salt and limestone or chalk together in the roasting-furnace and crystallizing out the carbonate of soda produced, which will be a soda-ash sufficiently pure. Instead of soda, potash or any other substance accessible from the reduction-works which will effect the reduction of chloride of silver to metallic silver by simple fusion with such substance may be used. When the first operation—the smelting—has been omitted, the melting with soda cannot be performed, on account of the great bulk of material. In this case the matt, after being roasted with salt, as in the fifth operation, is treated in the dissolving-vats with a boiling hot saturated solution of common salt, which dissolves out the chloride of silver, and the solution is added to that produced in the fourth operation; but in this case the gold will commonly be lost.

Seventh manipulation: The solution obtained in the fourth operation is passed through a common displacement filtering apparatus quite similar in its arrangement to the dissolving-vats, but having a thick layer of finely-divided metallic copper on the canvas. The silver is completely precipitated on the copper in the metallic state, and may be lifted off in a cake when a sufficient quantity is accumulated.

Eighth manipulation: The filtered solution is passed through the same apparatus again, now containing on the canvas filters scrap-iron instead of copper, when all the copper will be precipitated. Part of this copper is always to be reserved to be used in the seventh operation. The rest may be melted under charcoal and cast into ingots. The solution filtered through from the copper contains now nothing but sulphate of iron or copperas, which, if it will pay for the trouble and expense, may be easily gained by evaporating the liquid and crystallizing out the copperas.

For the purpose of refining, the silver obtained by operations sixth and seventh is melted in a cupel to free it from lead, and when refined and cast into ingots is ready for market. It contains the gold of the ore, which is best separated from it at the United States assay offices or mints.

The great advantage of my method over the ordinary method of treating argentiferous ores will be apparent from the following observations: First, when gold ores or auriferous pyrites occur with or near the silver ores, the gold from them is extracted during my process as a secondary product without additional expense; second, all the copper occurring in the ores is also obtained as a secondary product without additional expense; third, no mercury being used in the operation, the health of the workmen is not endangered by poisonous fumes; fourth, the cost of erecting reducing-works for my method is less than half of that for erecting stamp-mills of equal capacity; fifth, the mechanical power required is less than one-tenth of that required in stamp-mills of equal capacity; sixth, the loss of precious metals in tailings incident to the stamp-mill process is mostly avoided; seventh, all the quartz and gangue being got rid of by the first manipulation, the quantity of material to be pulverized and roasted is confined to actual metallic ore, which does not commonly amount to more than five per cent. of the whole mass, which by the old method must all be pulverized; eighth, at the usual prices of materials and labor my process will cost about one-half of the expense of treating by the old method; ninth, the silver obtained by my process is free from any alloy, and consequently of standard fineness, being mixed only with gold in case gold ores were added.

I claim as new and desire to secure by Letters Patent—

1. The within-described process for treating silver ores, consisting of eight different manipulations as enumerated under the proper heads.

2. The process as modified by omitting the first and sixth manipulations, and treating the ore as described under the second, third, fourth, fifth, seventh, and eighth heads.

3. The process as modified by omitting the fourth, seventh, and eighth manipulations, and treating the ore as described under the first, second, third, fifth, and sixth heads.

WILLIAM L. FABER.

Witnesses:
M. M. LIVINGSTON,
C. L. TOPLIFF.